United States Patent
Tetsuka

(10) Patent No.: US 9,765,852 B2
(45) Date of Patent: Sep. 19, 2017

(54) DEVICE FOR GUIDING LONG OBJECT

(71) Applicant: TSUBAKIMOTO CHAIN CO., Osaka-shi, Osaka (JP)

(72) Inventor: Takayuki Tetsuka, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 15/301,301

(22) PCT Filed: Mar. 26, 2015

(86) PCT No.: PCT/JP2015/059383
§ 371 (c)(1),
(2) Date: Sep. 30, 2016

(87) PCT Pub. No.: WO2015/151998
PCT Pub. Date: Oct. 8, 2015

(65) Prior Publication Data
US 2017/0023102 A1 Jan. 26, 2017

(30) Foreign Application Priority Data
Apr. 4, 2014 (JP) .................................. 2014-077965

(51) Int. Cl.
*F16G 13/16* (2006.01)
*H02G 3/04* (2006.01)

(52) U.S. Cl.
CPC ........... *F16G 13/16* (2013.01); *H02G 3/0475* (2013.01)

(58) Field of Classification Search
CPC ............................. F16G 13/16; H02G 11/006
(Continued)

(56) References Cited

U.S. PATENT DOCUMENTS 7,305,815 B2 * 12/2007 Utaki .................. H02G 11/006
  248/49
8,505,272 B1 * 8/2013 Komiya .................. F16G 13/16
  248/49
(Continued)

FOREIGN PATENT DOCUMENTS

CN    1347482 A    5/2002
CN    103256338 A  8/2013
(Continued)

OTHER PUBLICATIONS

International Search Report dated Jun. 30, 2015, issued in counterpart International Application No. PCT/JP2015/059383 (1 page).
(Continued)

*Primary Examiner* — David B Jones
(74) *Attorney, Agent, or Firm* — Westerman, Hattori, Daniels & Adrian, LLP

(57) ABSTRACT

A device for guiding a long object is provided with a plurality of links. Each of the links has a pair of link parts that face each other along a first direction. The links are linked together while being arranged in series along a second direction. Each pair of link parts is linked together in the outer end and inner end of the link by a first arm and a second arm for each pair. A space enclosed by each pair of link parts, the first arms, and the second arms and formed so as to extend in the second direction constitutes an accommodating space for accommodating a long object. Each pair of link parts is provided with an elastically deformable linking part for linking a first link-forming part and a second link-forming part. The linking part has a curved section.

6 Claims, 6 Drawing Sheets

(58) Field of Classification Search
USPC .................................... 59/78.1; 248/49, 51
See application file for complete search history.

(56) References Cited

U.S. PATENT DOCUMENTS

| | | |
|---|---|---|
| 2002/0056336 A1 | 5/2002 | Blase |
| 2003/0000198 A1 | 1/2003 | Hermey et al. |
| 2006/0112671 A1 | 6/2006 | Blase et al. |
| 2007/0163795 A1 | 7/2007 | Utaki et al. |
| 2007/0170305 A1 | 7/2007 | Utaki et al. |
| 2013/0212997 A1 | 8/2013 | Komiya |

FOREIGN PATENT DOCUMENTS

| | | |
|---|---|---|
| EP | 0 844 415 A1 | 5/1998 |
| JP | 2007-192367 A | 8/2007 |
| JP | 2007-285524 A | 11/2007 |

OTHER PUBLICATIONS

Notification of Transmittal of Translation of the International Preliminary Report on Patentability (Form PCT/IB/338) of International Application No. PCT/JP2015/059383, dated Oct. 4, 2016, with Forms PCT/IB/373 and PCT/ISA/237. (6 pages).

Office Action dated May 3, 2017, issued in counterpart Chinese Application No. 201580017696.1, with English translation. (11 pages).

* cited by examiner

DEVICE FOR GUIDING LONG OBJECT

BACKGROUND OF THE INVENTION

The present invention relates to a device for guiding a long object, which is, for example, a flexible cable for supplying electricity or a hose for supplying fluid to a movable unit, such as a machine tool, in accordance with movement of the movable unit with the long object accommodated in the device.

In general, this kind of device for guiding a long object includes links coupled to each other in a longitudinal direction. Each link includes a pair of opposing link portions. The link portions in each pair are coupled to each other by a first arm and a second arm, which faces the first arm. The link portions, the first arms, and the second arms define an accommodation space in which a long object is accommodated.

In a device for guiding a long object, each link includes a front side plate portion, a rear side plate portion, and a flexible coupling portion (e.g., refer to Patent Document 1). The coupling portion is formed between the front side plate portion and the rear side plate portion in an integrated manner by using the two-color molding. When the long object guiding device is curved, each coupling portion is elastically deformed to be bent.

PRIOR ART DOCUMENT

Patent Document

Patent Document 1: Japanese Laid-Open Patent Publication No. 2007-192367

SUMMARY OF THE INVENTION

In the long object guiding device disclosed in Patent Document 1, each coupling portion is made of fatigue-resistant plastic to maintain the durability of the coupling portion, which is repeatedly bent. However, stress concentrates on the central portion when the coupling portion is repeatedly bent since the coupling portion has a straight plate-like shape. Thus, room for improvement is left in improving the durability of each coupling portion.

Accordingly, it is an objective of the present invention to provide a device for guiding a long object that improves the durability of the coupling portions.

Means and its operational effect for achieving the above objective will now be described.

To achieve the above objective, a device for guiding a long object includes a plurality of links, a plurality of pairs of link portions, each pair of the link portions being included in one of the links and facing each other in a first direction, and a plurality of pairs of arms, each pair of the arms coupling a pair of the link portions to each other. The links are coupled together in a state of being arranged in series in a second direction, which is perpendicular to the first direction. Each pair of the link portions is coupled to each other at an outer end and an inner end of the corresponding link with the corresponding pair of the arms. A long object is accommodated in an accommodation space that is formed to be surrounded by the pairs of the link portions and the pairs of the arms and extend in the second direction. Each link portion includes a first link forming portion, a second link forming portion, which is arranged in parallel with the first link forming portion in the second direction, and an elastically deformable coupling portion, which couples the first link forming portion to the second link forming portion, and each coupling portion is configured to have a longer dimension than that in a case in which the first link forming portion and the second link forming portion are linearly coupled to each other in the second direction.

According to the configuration, a bent portion and a curved portion are formed in the coupling portion. Thus, when the serially coupled links are curved and the coupling portions are elastically deformed, stress occurring in the coupling portions is dispersed. Therefore, concentration of stress on the coupling portions is eased, thereby improving the durability of the coupling portions.

Preferably, in the device for guiding a long object, each coupling portion includes at least one curved portion.

According to the configuration, when the serially coupled links are curved and the coupling portions are elastically deformed, stress occurring in the coupling portion is allowed to be dispersed by the curved portion.

Preferably, in the device for guiding a long object, at least one of the curved portions is curved to project inward of a curve when the serially coupled links are curved.

According to the configuration, in comparison with the form in which the curved portion is curved to project outward of the curve when the serially coupled links are curved, the distance from the connection portion between the coupling portion and the first link forming portion or the connection portion between the coupling portion and the second link forming portion to the center of the circle of the curvature when the coupled links are curved is lengthened. Therefore, according to the principle of leverage, repulsive force by elastic restoring force of the coupling portion 22 that operates as resistance force when the coupled links are curved is allowed to be increased in comparison to when the curved portion is curved to project outward of the curve when the coupled links are curved.

Preferably, in the device for guiding a long object, each coupling portion includes a plurality of curved portions.

According to the configuration, when the serially coupled links are curved and the coupling portions are elastically deformed, stress occurring in the coupling portions is effectively dispersed by the curved portions.

Preferably, in the device for guiding a long object, a shape of each coupling portion is symmetrical with respect to a plane including a center in the second direction.

According to the configuration, stress occurring in the coupling portions when the coupled links rotate and the coupling portions are elastically deformed is dispersed in a balanced manner.

According to the present invention, the durability of the coupling portions is improved.

DETAILED DESCRIPTION OF THE PREFERRED EMBODIMENTS

A device for guiding a long object according to one embodiment will now be described with reference to the drawings.

Figure 1:
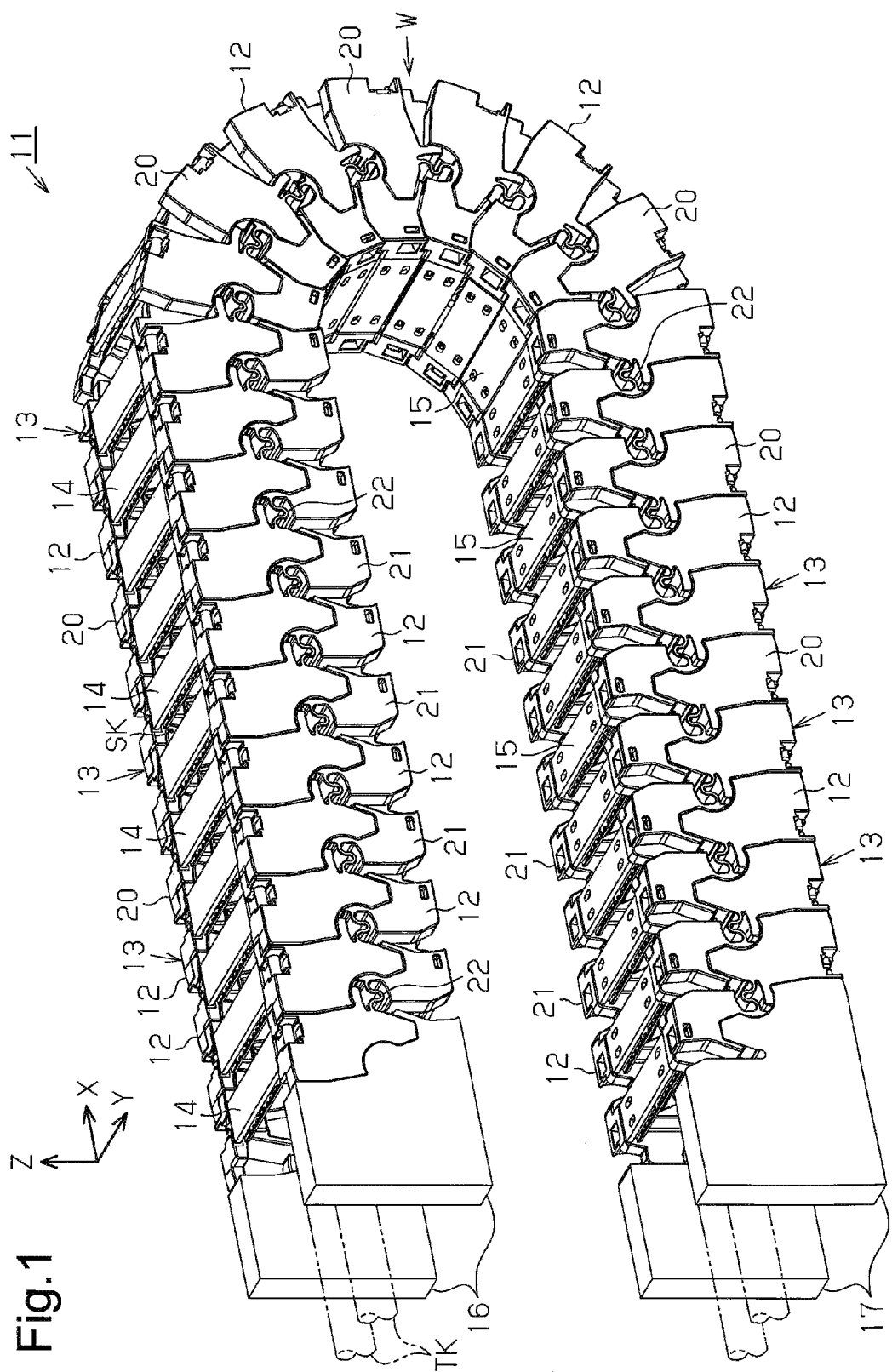
FIG. 1 is a perspective view of a device for guiding a long object according to one embodiment.

As shown in FIG. 1, a device for guiding a long object 11 is formed of synthetic plastic and includes links 13. Each link 13 includes two link portions 12, which are opposed to each other in a first direction Y. The first direction Y corresponds to the width direction of the long object guiding device 11. The links 13 are coupled to each other while being arranged in series in a second direction X, which is perpendicular to the first direction Y. The second direction X corresponds to the direction of the serial arrangement of the long object guiding device 11.

The link portions 12 of each link 13 are coupled to each other by a first arm 14 and a second arm 15, which are paired and arranged at the outer end and inner end of the link 13. In other words, the link portions 12 of each link 13 are coupled to each other by the corresponding first arm 14 and second arm 15, which are respectively located at the outer end and the inner end of the link 13. The first arms 14 and the second arms 15 each have a substantially rectangular, plate-like shape. A third direction Z is perpendicular to both the first direction Y and the second direction X and corresponds to the thickness direction of the long object guiding device 11.

The first arm 14 and the second arm 15, which couple the link portions 12 in each pair to each other, are detachably mounted to the link portions 12. The long object guiding device 11 includes the first arms 14 and the second arms 15, which are paired and arranged to face each other in the third direction Z.

A moving end bracket 16 to be coupled to a movable body (not shown), which reciprocally moves in the second direction X, is coupled to one of the links 13 that is located at the leading end of the long object guiding device 11. A fixing end bracket 17 to be fixed to a fixing portion (not shown) is coupled to one of the links 13 that is located at the trailing end of the long object guiding device 11.

In the links 13, a space that is surrounded by the pairs of link portions 12, the first arms 14, and the second arms 15 and extends in the second direction X is defined as an accommodation space SK. The accommodation space SK accommodates long objects TK, which are flexibly bendable. The long object guiding device 11 guides the long objects TK along with reciprocation of the movable body that is coupled to the moving end bracket 16 while protecting the long objects TK, which are accommodated in the accommodation space SK.

In this case, the long object guiding device 11 is arranged to form a curved portion W in the middle part. The curved portion W moves with reciprocation in the second direction X of the movable body coupled to the moving end bracket 16.

The long objects TK may be, for example, electric cables for supplying electricity to the movable body, optical fiber cables for transmitting signals to the movable body, hoses for supplying gas (for example, air) or liquid (for example, water or oil) to the movable body, and long articulated members, which are flexibly bendable.

The structure of each link portion 12 will now be described in detail.

Figure 2:
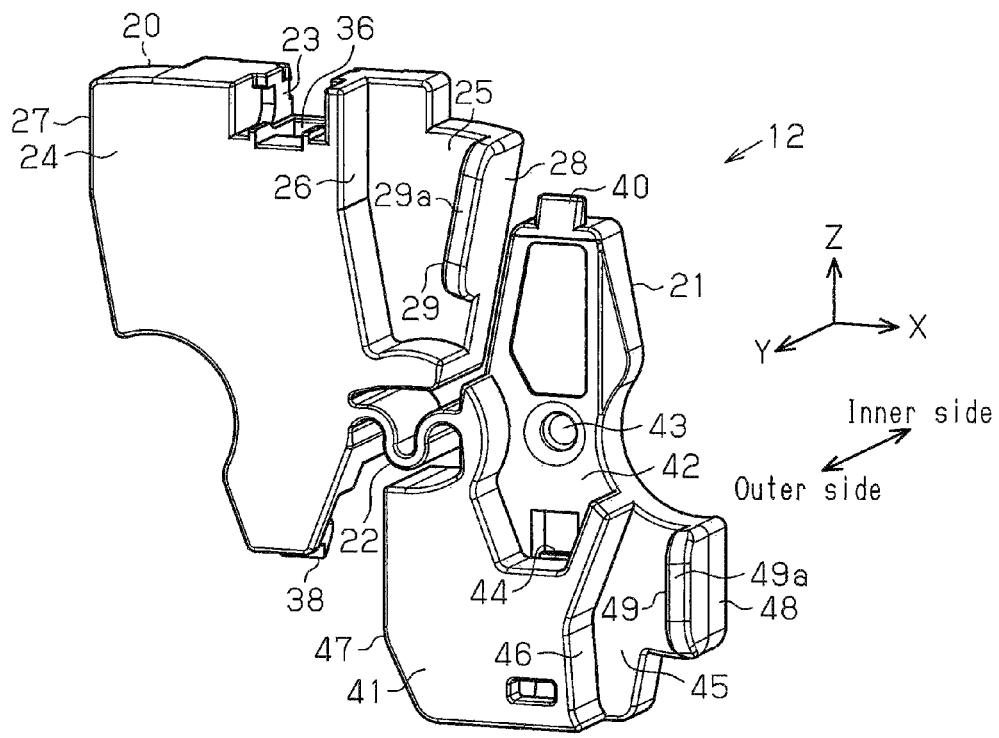
FIG. 2 is a perspective view of a link portion of the device for guiding a long object of FIG. 1 when viewed from the outer side.

As shown in FIG. 2, each link portion 12 includes a plate-shaped first link forming portion 20, a plate-shaped second link forming portion 21, and a flexibly deformable coupling portion 22. The second link forming portion 21 is arranged in parallel with the first link forming portion 20 in the second direction X. The coupling portion 22 couples the first link forming portion 20 and the second link forming portion 21 such that the first link forming portion 20 and the second link forming portion 21 are displaced relative to each other in the third direction Z. A first end (the upper end in FIG. 2) of the first link forming portion 20 in the third direction Z includes a mounting recess 23, to which the corresponding first arm 14 (refer to FIG. 1) is detachably mounted.

The first link forming portion 20 includes a first indentation face 25 on the outer side face 24 at a location in the vicinity of the second link forming portion 21 from the mounting recess 23. The first indentation face 25 is depressed inward and has a substantially sectorial shape. A first step face 26 is formed between the outer side face 24 and the first indentation face 25. The first indentation face 25 is, in FIG. 2, located on the upper side of the coupling portion 22. The first step face 26 is shaped to bend at an obtuse angle in a middle part in the third direction Z.

Of the ends of the first link forming portion 20 in the second direction X, the one end that is on the opposite side to the second link forming portion 21 includes a first contact face 27, which has a shape corresponding to the first step face 26. Of the ends of the first link forming portion 20 in the second direction X, the other end, which is in the vicinity of the second link forming portion 21, includes a second contact face 28. The end of the first indentation face 25 that is in the vicinity of the second link forming portion 21 includes a substantially rectangular, plate-shaped first engaging projection 29 projecting outward. The distal end face 29a of the first engaging projection 29 is located a little inward relative to the outer side face 24 of the first link forming portion 20.

Figure 3:
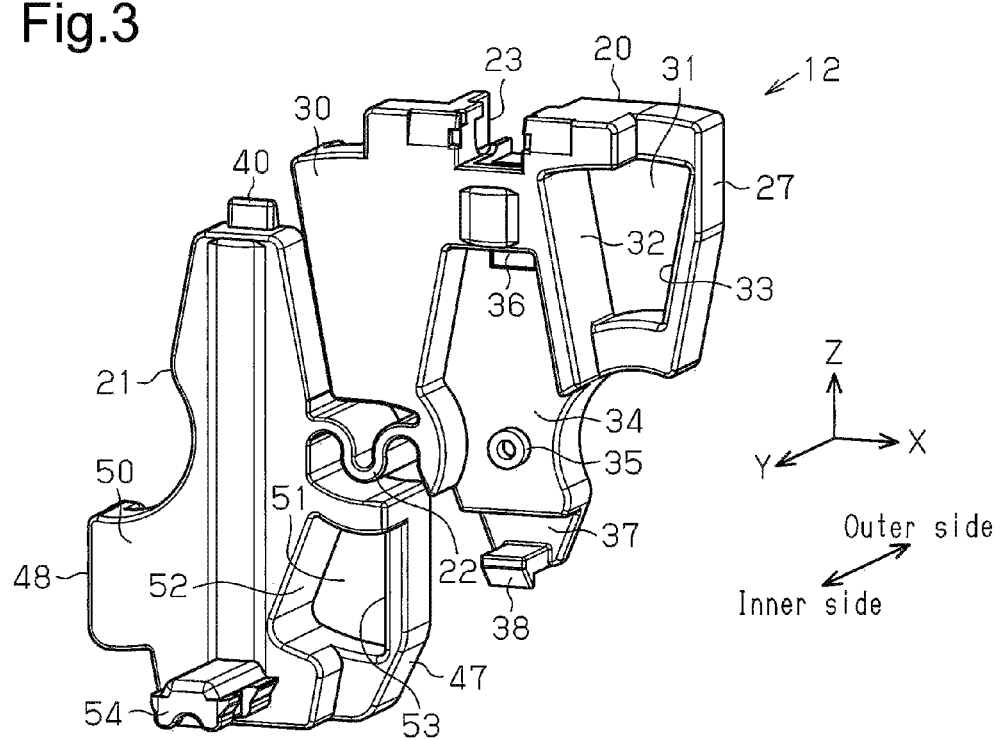
FIG. 3 is a perspective view of the link portion of the device for guiding a long object of FIG. 1 when viewed from the inner side.

As shown in FIGS. 2 and 3, the inner side face 30 of the first link forming portion 20 includes a substantially sectorial first recess 31, which is located on the opposite side of the mounting recess 23 from the second link forming portion 21. Of the side faces of the first recess 31 in the second direction X, the side face that is in the vicinity of the second link forming portion 21 includes a first pressure receiving face 32. Of the side faces of the first recess 31 in the second direction X, the side face that is on the opposite side to the second link forming portion 21 includes a second pressure receiving face 33.

The inner side face 30 of the first link forming portion 20 includes a second indentation face 34, which is recessed outward, between the first recess 31 and the coupling portion 22. The second indentation face 34 includes an annular projection 35, which is located adjacent to the coupling portion 22 in the second direction X. The second indentation face 34 includes a first locking hole 36, which is in the vicinity of the mounting recess 23 and extends to reach the mounting recess 23. The second indentation face 34 includes a third indentation face 37, which is on the opposite side to the mounting recess 23 and recessed outward more than the second indentation face 34. Of the ends of the third indentation face 37 in the third direction Z, the one end that is on the opposite side to the mounting recess 23 is provided with a first locking portion 38 to extend inward.

A second locking portion 40 is arranged to extend on a first end (the upper end in FIG. 2) of the second link forming portion 21 in the third direction Z. The second locking portion 40 is locked to the first locking hole 36 of the first link forming portion 20 of the adjacent link 13 (refer to FIG. 1). The outer side face 41 of the second link forming portion 21 includes a fourth indentation face 42, which is recessed inward, in an area from the central portion to the second locking portion 40 in the third direction Z.

A circular insert recess portion 43 is arranged on the fourth indentation face 42 and is located adjacent to the coupling portion 22 in the second direction X. The projection 35 of the first link forming portion 20 of the adjacent link 13 (refer to FIG. 1) is inserted into the insert recess portion 43. The fourth indentation face 42 includes a second locking hole 44, which is on the opposite side to the second locking portion 40 in the third direction Z. The first locking portion 38 of the first link forming portion 20 of the adjacent link 13 (refer to FIG. 1) is locked to the second locking hole 44.

The outer side face 41 of the second link forming portion 21 includes a substantially sectorial fifth indentation face 45, which is recessed inward. The fifth indentation face 45 is located on the opposite side of the fourth indentation face 42 from the first link forming portion 20. A second step face 46 is formed between the outer side face 41 and the fifth indentation face 45. The second step face 46 bends at an obtuse angle in the central portion in the third direction Z.

Of the ends of the second link forming portion 21 in the second direction X, the one that is in the vicinity of the first link forming portion 20 includes a third contact face 47, which has a shape corresponding to the second step face 46. Of the ends of the second link forming portion 21 in the second direction X, the other end, which is on the opposite side to the first link forming portion 20, includes a fourth contact face 48. Of the ends of the fifth indentation face 45 in the second direction X, the one that is on the opposite side to the first link forming portion 20 is provided with a substantially rectangular, plate-shaped second engaging projection 49 to project outward. The distal end face 49a of the second engaging projection 49 is located a little inward relative to the outer side face 41 of the second link forming portion 21.

Of the ends of the inner side face 50 of the second link forming portion 21 in the second direction X, the one that is in the vicinity of the first link forming portion 20 includes a substantially sectorial second recess portion 51. The second recess portion 51 is located on the lower side of the coupling portion 22 in FIG. 3. Of the side faces of the second recess portion 51 in the second direction X, the one that is on the opposite side to the first link forming portion 20 includes a third pressure receiving face 52. Of the side faces of the second recess portion 51 in the second direction X, the one that is in the vicinity of the first link forming portion 20 includes a fourth pressure receiving face 53. Of the ends of the inner side face 50 of the second link forming portion 21 in the third direction Z, the one that is on the opposite side to the second locking portion 40 is provided with a mounting projection 54 to extend inward. The second arm 15 (refer to FIG. 1) is detachably mounted to the mounting projection 54.

When two link portions 12 that are adjacent to each other in the second direction X are coupled to each other, the second locking portion 40 of the second link forming portion 21 of one of the two link portions 12 is first inserted in the first locking hole 36 of the first link forming portion 20 of the other link portion 12. Next, the second locking hole 44 of the second link forming portion 21 in one of the link portions 12 is locked to the first locking portion 38 of the first link forming portion 20 in the other link portion 12.

Thus, the second link forming portion 21 in one of the two link portions 12 is coupled to the first link forming portion 20 in the other link portion 12.

At this time, the first engaging projection 29 of the first link forming portion 20 in one of the two link portions 12 is inserted into the first recess 31 of the first link forming portion 20 in the other link portion 12. Furthermore, the second engaging projection 49 of the second link forming portion 21 in one of the link portions 12 is movably inserted in the second recess portion 51 of the second link forming portion 21 of the other link portion 12. Further, at this time, the projection 35 of the first link forming portion 20 in one of the link portions 12 is movably inserted in the insert recess portion 43 of the second link forming portion 21 in the other link portion 12.

Figure 4:
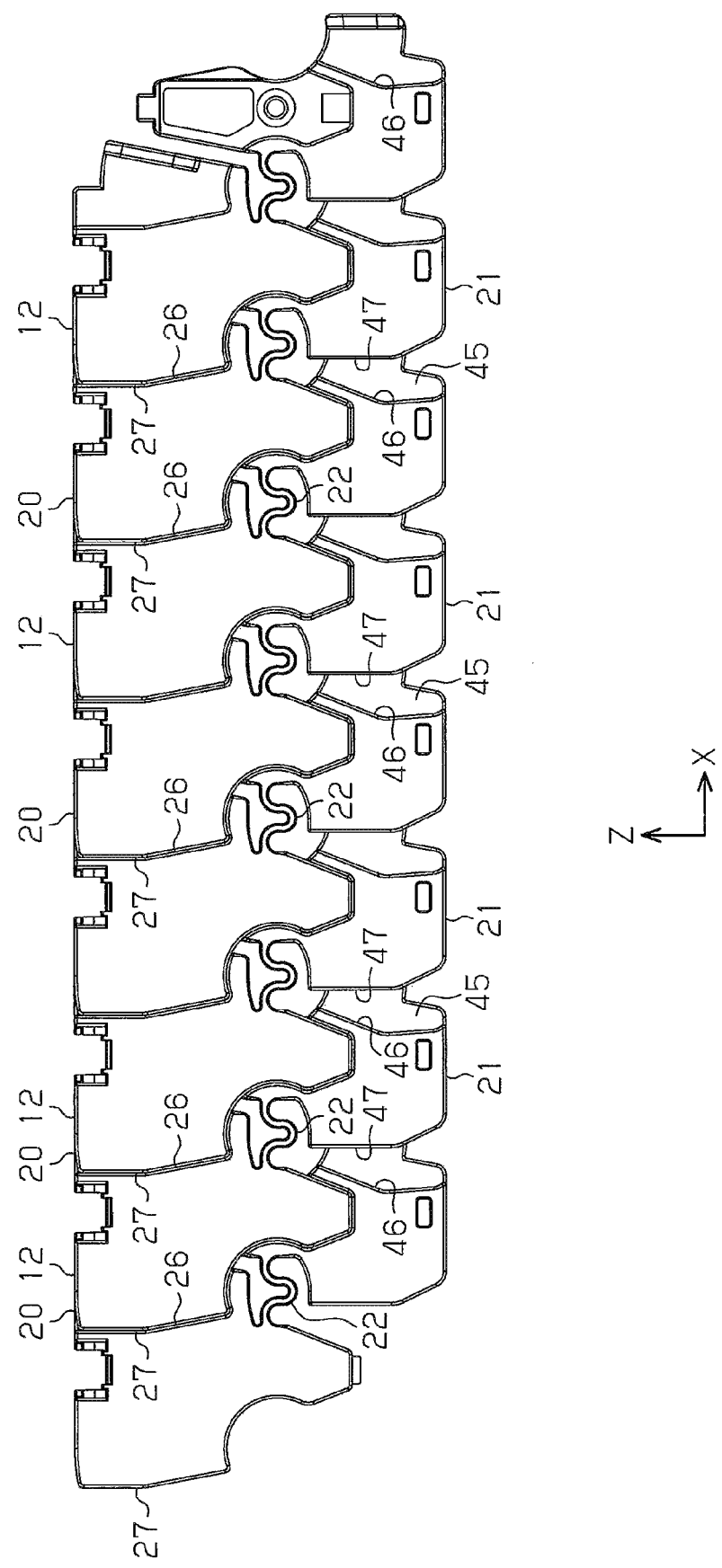
FIG. 4 is a side view of the serially coupled link portions in a linear state.

In this way, the link portions 12 are sequentially coupled in series. The serially coupled link portions 12 change the shape between a linear state and a curved state. In the linear state, as shown in FIG. 4, the link portions 12 linearly extend in the second direction X. In the curved state, as shown FIG. 5, the link portions 12 are curved at a predetermined curvature.

When the serially coupled link portions 12 are in the linear state as shown in FIG. 4, the first step face 26 of the first link forming portion 20 of each link portion 12 is in contact with the first contact face 27 of the first link forming portion 20 of the adjacent link portion 12. In this case, the second step face 46 of the second link forming portion 21 of each link portion 12 is apart from the third contact face 47 of the second link forming portion 21 of the adjacent link portion 12.

Figure 5:
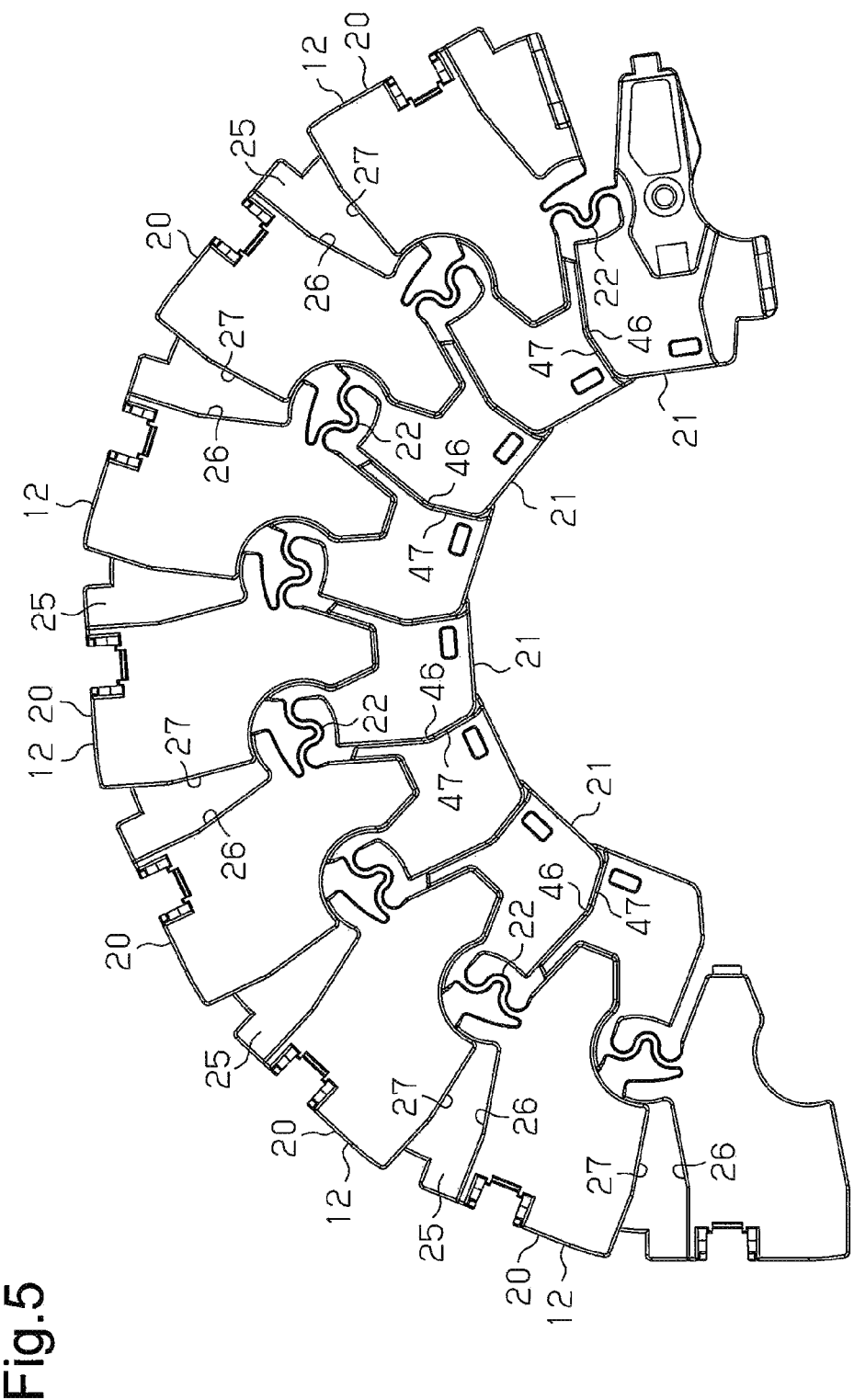
FIG. 5 is a side view of the serially coupled link portions in a curved state.

When the serially coupled link portions 12 are in the curved state as shown in FIG. 5, the first step face 26 of the first link forming portion 20 in each link portion 12 is apart from the first contact face 27 of the first link forming portion 20 in the adjacent link portion 12. In this case, the second step face 46 of the second link forming portion 21 in each link portion 12 is in contact with the third contact face 47 of the second link forming portion 21 in the adjacent link portion 12. The coupling portion 22 of each link portion 12 is bowed.

Figure 6:
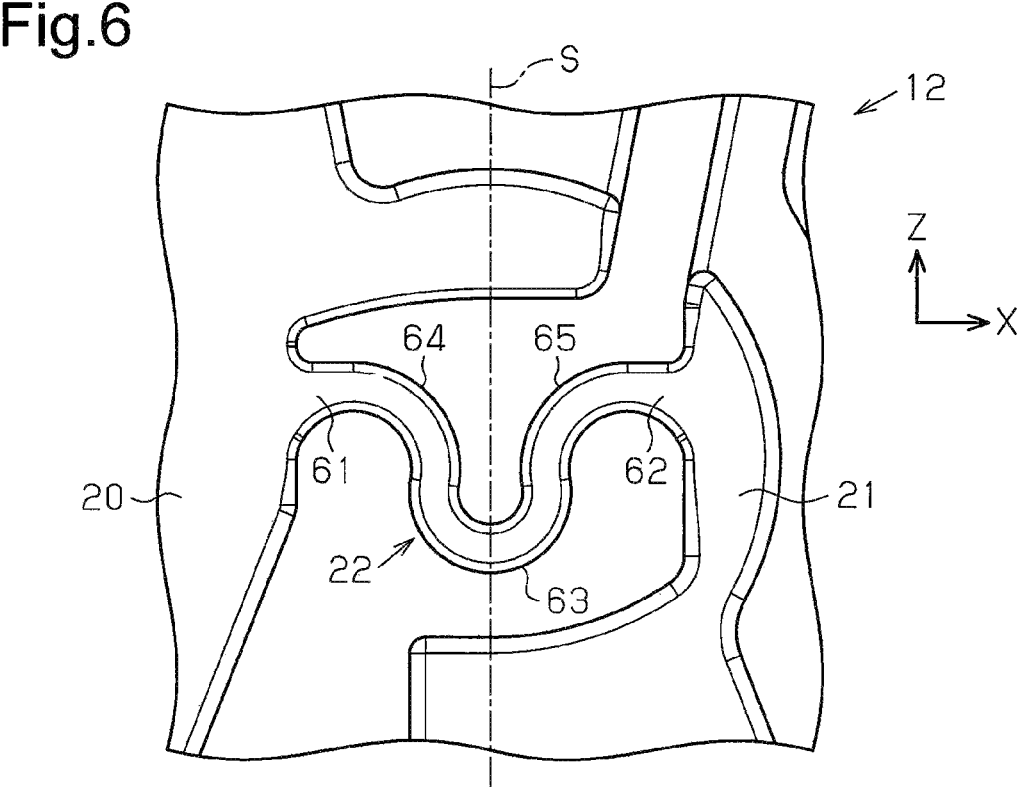
FIG. 6 is an enlarged view of a main part of FIG. 4.

As shown in FIGS. 2 and 6, each coupling portion 22 has a shape obtained by curving a belt-like plate member. One end of the coupling portion 22 in the second direction X is connected to the first link forming portion 20, and the other end is connected to the second link forming portion 21. A portion of the coupling portion 22 that is connected to the first link forming portion 20 constitutes a first connection portion 61. A portion of the coupling portion 22 that is connected to the second link forming portion 21 constitutes a second connection portion 62.

As shown in FIG. 6, the coupling portion 22 includes a first curved portion 63, a second curved portion 64, and a third curved portion 65. The first curved portion 63 is arranged in the central portion in the second direction X and curved to have a U-shape. The second curved portion 64 is arranged between the first curved portion 63 and the first connection portion 61. The third curved portion 65 is arranged between the first curved portion 63 and the second connection portion 62. Therefore, the coupling portion 22 is configured to have a longer dimension than that in a case in which the first link forming portion 20 and the second link forming portion 21 are linearly coupled in the second direction X.

The first curved portion 63 is curved to project inward of the curve when the serially coupled link portions 12 (the links 13) are in the curved state as shown in FIG. 5. The second curved portion 64 and the third curved portion 65 are curved to expand substantially outward of the curve when the serially coupled link portions 12 (the links 13) are in the curved state as shown in FIG. 5.

When the serially coupled link portions 12 (the links 13) are in the linear state, the coupling portion 22 has a shape to be symmetrical with respect to a plane S that is located in the center of the coupling portion 22 in the second direction X and perpendicular to the second direction X.

Operation of the long object guiding device 11 will now be described.

The long object guiding device 11 is used in such a manner that the leading end coupled to the moving end bracket 16 reciprocally moves in the second direction X. The long object guiding device 11 is used in such a manner that the link portions 12 (the links 13) coupled in the second direction X repeatedly change the shape between the linear state as shown in FIG. 4 and the curved state as shown in FIG. 5.

Figure 7:
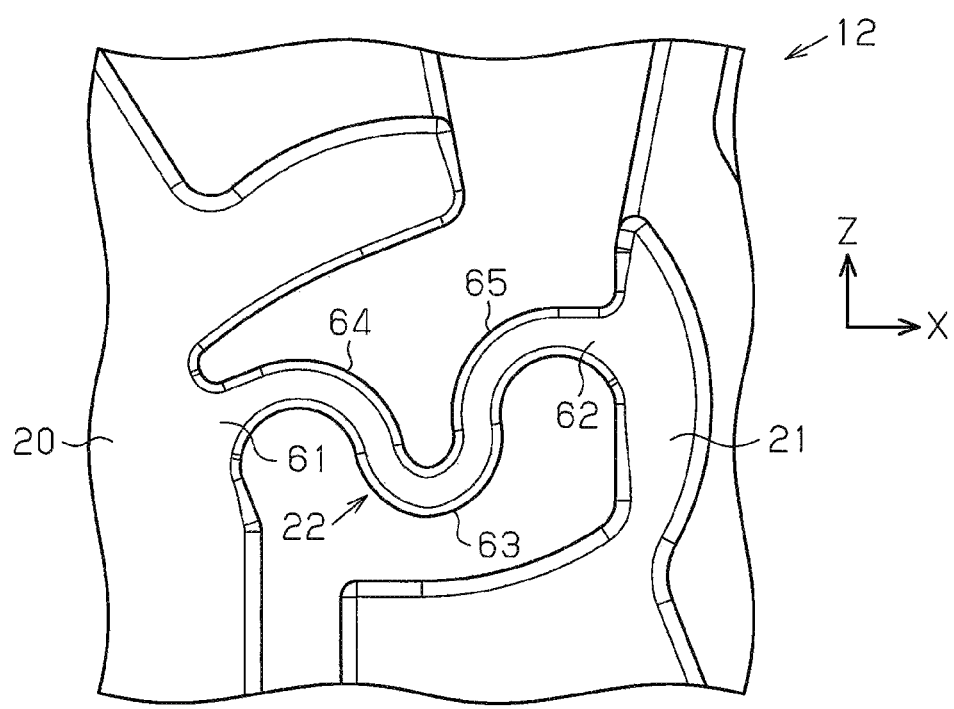
FIG. 7 is an enlarged view of a main part of FIG. 5.

Each coupling portion 22 includes the first to third curved portions 63 to 65 as shown in FIG. 6. Thus, when the serially coupled link portions 12 change the shape from the linear state to the curved state, especially, the first curved portion 63 is elastically deformed to expand in the second direction X as shown in FIG. 7. Thus, the stress occurring in the coupling portion 22 is dispersed. Therefore, concentration of stress on the coupling portion 22 is eased, thereby improving the durability of the coupling portion 22.

When the first curved portion 63 is elastically deformed to expand in the second direction X, the coupling portion 22 pulls the first link forming portion 20 and the second link forming portion 21, which are connected to the two ends of the coupling portion 22, with its own elastic restoring force. The elastic restoring force of the coupling portion 22 operates as resistance force (repulsive force) when the coupled link portions 12 change the shape from the linear state to the curved state.

Therefore, when the coupled link portions 12 change the shape from the linear state to the curved state, the impact is eased that is generated when the second step face 46 of the second link forming portion 21 in each link portion 12 contacts the third contact face 47 of the second link forming portion 21 in the adjacent link portion 12. Thus, the occurrence of impact noise caused by these contacts is reduced.

According to the above-illustrated embodiment, the following advantages are achieved.

(1) In the long object guiding device 11, the coupling portion 22 of each link portion 12 includes the first to third curved portions 63 to 65. Thus, when the serially coupled link portions 12 (the links 13) change the shape between the linear state and the curved state and each coupling portion 22 is elastically deformed, the first to third curved portions 63 to 65 allow the stress occurring in the coupling portions 22 to be dispersed. Thus, concentration of stress on the coupling portion 22 is eased, thereby improving the durability of the coupling portion 22.

(2) In the long object guiding device 11, the first curved portion 63 of the coupling portion 22 of each link portion 12 is curved to have a U-shape to project inward of the curve when the serially coupled link portions 12 (the links 13) are in the curved state. This lengthens the distance from the first connection portion 61 or the second connection portion 62 of the coupling portion 22 to the center of circle of the curvature when the coupled link portions 12 (the links 13) are curved in comparison to the form in which the first curved portion 63 is curved to have a U-shape to project outward of the curve when the coupled link portions 12 (the links 13) are in the curved state. Therefore, according to the principle of leverage, elastic restoring force of the coupling portion 22 that operates as resistance force when the coupled link portions 12 (the links 13) are curved is increased in comparison to the form in which the first curved portion 63 is curved to have a U-shape to project outward of the curve when the coupled link portions 12 (the links 13) are in the curved state. Therefore, when the serially coupled link portions 12 (the links 13) change the shape from the linear state to the curved state, the impact is eased that is generated when the second step face 46 of the second link forming portion 21 in each link portion 12 contacts the third contact face 47 of the second link forming portion 21 in the adjacent link portion 12. Thus, the occurrence of impact noise caused by these contacts is reduced.

Modifications

The above-illustrated embodiment may be modified in the following forms.

Figure 8A:
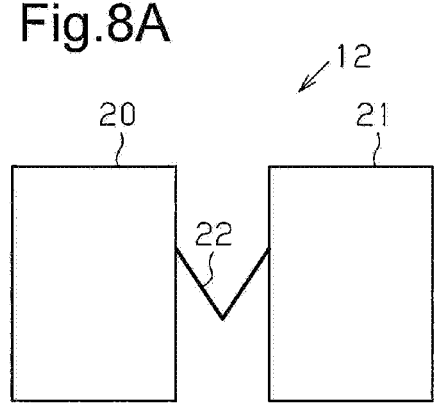
FIGS. 8A to 8F are schematic views of link portions of a device for guiding a long object in modifications.

As shown in FIG. 8A, the coupling portion 22 may be bent to have a V-shape. In other words, the coupling portion 22 may have one bent portion.

Figure 8B:
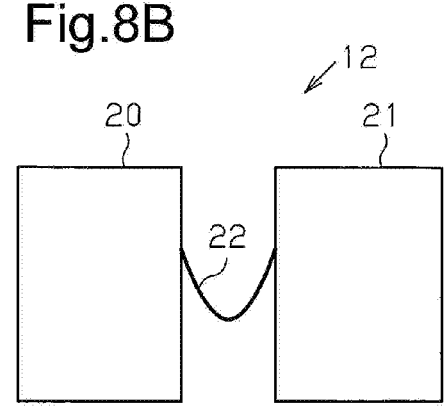

As shown in FIG. 8B, the coupling portion 22 may be curved to have a U-shape. In other words, the coupling portion 22 may have one curved portion.

Figure 8C:
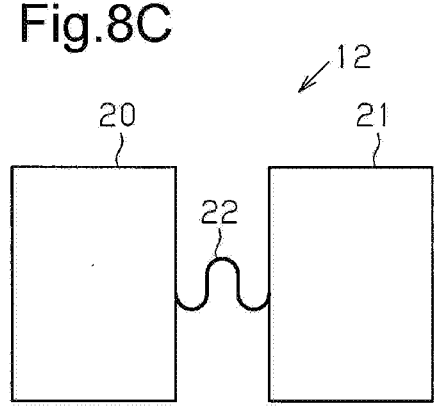

As shown in FIG. 8C, the coupling portion 22 may have a shape obtained by reversing the orientations of the first to third curved portions 63 to 65.

Figure 8D:
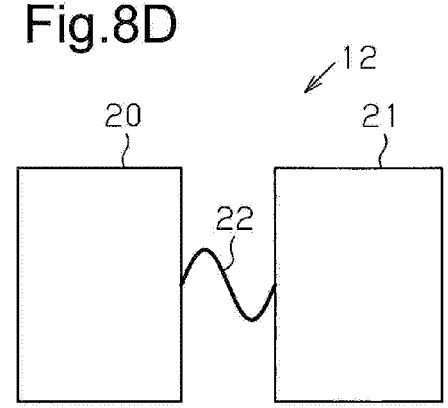

As shown in FIG. 8D, the coupling portion 22 may have a sine curve-like shape.

Figure 8E:
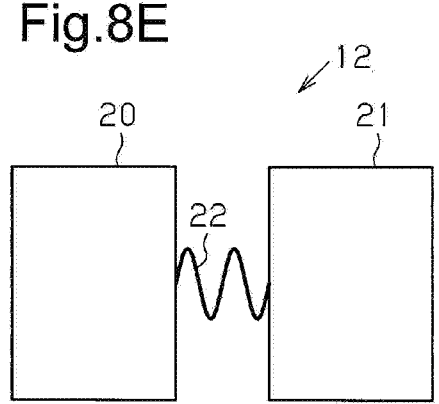

As shown in FIG. 8E, the coupling portion 22 may be curved to have a zig-zag shape.

Figure 8F:
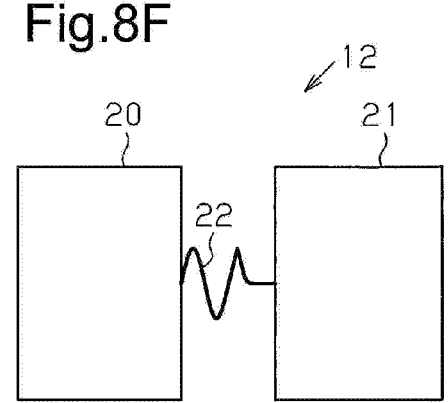

As shown in FIG. 8F, the coupling portion 22 may have a shape including both a curved portion and a bent portion. In this case, the number and orientation of curved portions and bent portions may be set any.

DESCRIPTION OF THE REFERENCE NUMERALS

11 . . . device for guiding a long object, 12 . . . link portion, 13 . . . link, 14 . . . first arm, 15 . . . second arm, 20 . . . first link forming portion, 21 . . . second link forming portion, 22 . . . coupling portion, 63 . . . first curved portion, 64 . . . second curved portion, 65 . . . third curved portion, SK . . . accommodation space, TK . . . long object, X . . . second direction, Y . . . first direction, Z . . . third direction.

The invention claimed is:

1. A device for guiding a long object comprising
a plurality of links;
a plurality of pairs of link portions, each pair of the link portions being included in one of the links and facing each other in a first direction; and
a plurality of pairs of arms, each pair of the arms coupling a pair of the link portions to each other, wherein
the links are coupled together in a state of being arranged in series in a second direction, which is perpendicular to the first direction,
each pair of the link portions is coupled to each other at an outer end and an inner end of the corresponding link with the corresponding pair of the arms,
a long object is accommodated in an accommodation space that is formed to be surrounded by the pairs of the link portions and the pairs of the arms and extend in the second direction,
each link portion includes a plate-shaped first link forming portion, a plate-shaped second link forming portion, which is arranged in parallel with the first link forming portion in the second direction, and an elastically deformable coupling portion, which couples the first link forming portion to the second link forming portion such that the first link forming portion and the second link forming portion are displaced relative to each other in a third direction, the third direction is perpendicular to both the first direction and the second direction, and each coupling portion is configured to have a length that is entirely greater than that of a straight line between the first link forming portion and the second link forming portion when the links are coupled together in series linearly in the second direction.

2. The device for guiding a long object according to claim 1, wherein each coupling portion includes at least one curved portion.

3. The device for guiding a long object according to claim 2, wherein at least one of the curved portions is curved to project in a direction opposite to a bending direction of the links coupled together in series.

4. The device for guiding a long object according to claim 2, wherein each coupling portion includes a plurality of curved portions.

5. The device for guiding a long object according to claim 1, wherein a shape of each coupling portion is symmetrical with respect to a plane including a center in the second direction.

6. The device for guiding a long object according to claim 1, wherein the entirety of each coupling portion has a length that is greater than that of a straight line between the first link forming portion and the second link forming portion when the links are coupled together in series linearly in the second direction.

* * * * *